(12) United States Patent
Chang et al.

(10) Patent No.: US 11,445,528 B2
(45) Date of Patent: Sep. 13, 2022

(54) METHOD IMPLEMENTED BY USER EQUIPMENT AND USER EQUIPMENT

(71) Applicants: SHARP KABUSHIKI KAISHA, Sakai (JP); FG Innovation Company Limited, Tuen Mun (HK)

(72) Inventors: Ningjuan Chang, Shanghai (CN); Fangying Xiao, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/972,892

(22) PCT Filed: Jun. 6, 2019

(86) PCT No.: PCT/CN2019/090293
§ 371 (c)(1),
(2) Date: Dec. 7, 2020

(87) PCT Pub. No.: WO2019/233472
PCT Pub. Date: Dec. 12, 2019

(65) Prior Publication Data
US 2021/0258986 A1    Aug. 19, 2021

(30) Foreign Application Priority Data
Jun. 7, 2018  (CN) .......................... 201810585298.5

(51) Int. Cl.
*H04W 72/12* (2009.01)
*H04W 72/00* (2009.01)
*H04W 74/08* (2009.01)

(52) U.S. Cl.
CPC ..... *H04W 72/1263* (2013.01); *H04W 72/005* (2013.01); *H04W 72/1257* (2013.01); *H04W 74/0833* (2013.01)

(58) Field of Classification Search
CPC .......... H04W 72/1263; H04W 72/005; H04W 72/1257; H04W 74/0833
See application file for complete search history.

(56) References Cited

U.S. PATENT DOCUMENTS

2017/0086114 A1* 3/2017 Jung ..................... H04W 52/46
2018/0035361 A1  2/2018 Ishii
(Continued)

FOREIGN PATENT DOCUMENTS

WO    2016121514    8/2016

OTHER PUBLICATIONS

Samsung, "SIB1 Content for SI Request", R2-1804881,3GPP TSG-RAN2 101 bis,Sanya, China, Apr. 16-20, 2018.
(Continued)

*Primary Examiner* — Ajay Cattungal
(74) *Attorney, Agent, or Firm* — ScienBiziP, P.C.

(57) ABSTRACT

A method of system information transmissions performed by a user equipment (UE) includes receiving a system information (SI) scheduling information list for a plurality of SI messages and a random access resource list for a plurality of SI requests via a system information block type 1 (SIB1), and determining, when a plurality of random access resource entries exist in the random access resource list for the plurality of SI requests including a first SI request and a second SI request, that a first entry of the plurality of random access resource entries in the random access resource list for the first SI request corresponds to a first entry in the SI scheduling information list and that a second entry of the plurality of random access resource entries in the random (Continued)

UE initiates a procedure for requesting on-demand system information — 101

UE performs radio resource allocation management — 103 access resource list for the second SI request corresponds to a second entry in the SI scheduling information list.

4 Claims, 2 Drawing Sheets

(56) References Cited

U.S. PATENT DOCUMENTS

| | | | |
|---|---|---|---|
| 2018/0049107 A1* | 2/2018 | Johansson | H04W 72/005 |
| 2018/0092027 A1 | 3/2018 | Sheng | |
| 2018/0270115 A1* | 9/2018 | Mallick | H04L 41/0813 |
| 2018/0270865 A1* | 9/2018 | Mallick | H04W 72/12 |
| 2019/0174554 A1* | 6/2019 | Deenoo | H04W 8/22 |
| 2019/0313232 A1* | 10/2019 | Lee | H04W 4/90 |
| 2019/0320455 A1* | 10/2019 | Chen | H04W 76/50 |
| 2019/0342165 A1* | 11/2019 | Basu Mallick | H04L 41/0813 |
| 2020/0052867 A1* | 2/2020 | Tsuboi | H04W 74/08 |
| 2020/0112897 A1* | 4/2020 | Jung | H04W 48/20 |
| 2020/0187100 A1* | 6/2020 | Kim | H04W 36/14 |

OTHER PUBLICATIONS

Intel Corporation, "Remaining issues on on-demand System Information", R2-1805017,3GPP TSG-RAN WG2 meeting #101bis,Sanya, China, Apr. 16-20, 2018.

Samsung, "Other system information delivery", R1-1715911,3GPP TSG RAN WG1 Meeting NR#3 Nagoya, Japan, Sep. 18-21, 2017.

Huawei et al., "ASN.1 for the PRACH resource of on-demand SI request", R2-1805232,3GPP TSG-RAN WG2 Meeting 101bis,Sanya, China, Apr. 16-20, 2018.

Ericsson,"System information structure and contents", R2-1712483,3GPP TSG-RAN WG2#100,Reno, Nevada, USA, Nov. 27-Dec. 1, 2017.

* cited by examiner

METHOD IMPLEMENTED BY USER EQUIPMENT AND USER EQUIPMENT

TECHNICAL FIELD

The present invention is related to the technical field of radio communication, and, specifically, to a method implemented by a user equipment and the corresponding user equipment.

BACKGROUND

At the 3rd Generation Partnership Project (3GPP) RAN #75 plenary session held in March 2016, NTT DOCOMO proposed a new research project on 5G technology standards (see non-patent document RP-170847: New WID on New Radio (NR) Access Technology) and the project was approved. The purpose of this research project was to develop an NR access technology to meet all application scenarios, requirements, and deployment environments of 5G. In this research project, NR specifically included two application scenarios: Enhanced Mobile Broadband (eMBB) and Ultra Reliable and Low Latency Communications (URLLC). According to the plans of the research project, the standardization of NR would be performed in two phases: the first phase of standardization would be completed in mid-2018; and the second phase of standardization would be completed by the end of 2019. For the first phase, the standard specifications should be forward-compatible with the standard specifications of the second phase. For the second phase, the standard specifications should be based on the standard specifications of the first phase and meet all the requirements of the 5G NR technical standards.

In addition to continuing to utilize the method in the long-term evolution (LTE) system where the network side actively transmits cell system information to a user equipment (UE) via broadcasting or dedicated signaling, a new system information transmission method is further introduced in NR, specifically, on-demand system information transmission as requested by the UE. The system information in the NR system is divided into two parts: minimum system information and on-demand system information.

The minimum system information includes basic information of the cell used for UE camping and initial access, and usually includes a Master Information Block (MIB) and System Information Block Type 1 (SIB1). The on-demand system information refers to System Information Blocks (SIBs) other than the minimum system information, such as System Information Block Type 3 and so on.

Multiple SIBs with the same transmission period can be combined for transmission as a Radio Resource Control (RRC) message, which is known as a System Information (SI) message.

The on-demand system information may adopt a periodic broadcast method similar to the minimum system information and may adopt a method in which a transmission is performed as requested by the UE. A base station broadcasts system information broadcast status indication information to inform the UE whether the SIB or SI is on-demand or broadcast.

The content contained in each system information block is not detailed with regard to the present invention. For details, please refer to 3GPP Technical Specification (TS) 38.331. The NR system supports adoption of a transmission method based on a UE request for the previously disclosed on-demand system information. In the present invention, a solution for the problem of how to implement a system information transmission method based on a UE request is proposed.

SUMMARY

The present invention has been proposed in an effort to solve at least some of the previously disclosed problems in the prior art. The present invention provides a method performed by a user equipment and the user equipment thereof, which may effectively implement radio resource allocation management during a procedure for requesting on-demand system information by the UE.

According to the present invention, a method performed by a user equipment is proposed, the method comprising: initiating a procedure for requesting on-demand system information requested by the user equipment; and performing radio resource allocation management, wherein the step of performing radio resource allocation management comprises performing one or more of the following operations: applying a default physical layer configuration; applying default medium access control, and applying a default semi-persistent scheduling configuration.

Preferably, the initiating a procedure for requesting on-demand system information requested by a user equipment comprises transmission of system information requested by the user equipment or a message for initiating a RRC system information request.

In addition, according to the present invention, a method performed by a user equipment is proposed, the method comprising: ending a procedure of requesting on-demand system information by a user equipment; and performing radio resource allocation management, wherein the step of performing radio resource allocation management comprises performing one or more of the following operations: releasing a default physical layer configuration, releasing a default medium access control configuration, and releasing a default semi-persistent scheduling configuration and performing re-establishment of a radio link control layer corresponding to a radio bearer.

Preferably, the ending a procedure of requesting on-demand system information by a user equipment comprises: receiving a confirmation of a system information request from a lower layer, receiving a confirmation of a RRC system information request message from a lower layer, or receiving an indication of random access failure from a lower layer, or random access failure for system information request.

In addition, according to the present invention, a method performed by a user equipment is proposed, the method comprising: initiating cell reselection in a procedure of requesting on-demand system information by the user equipment; and performing radio resource allocation management, wherein the step of performing radio resource allocation management comprises performing one or more of the following operations: releasing a default physical layer configuration, releasing a default medium access control configuration, releasing a default semi-persistent scheduling configuration, performing reestablishment of a radio link control layer corresponding to a radio bearer, and resetting a media access control.

Preferably, the "in a process of requesting on-demand system information by user equipment" comprises: before receiving a confirmation of a system information request from a lower layer, before receiving a confirmation of a RRC system information request from a lower layer, or before the completion of a random access procedure for system information request.

In addition, according to the present invention, a method performed by a user equipment is proposed, the method comprising: initiating by the user equipment to interrupt a system information request procedure in a procedure of requesting on-demand system information; and performing radio resource allocation management, wherein the step of performing radio resource allocation management comprises performing one or more of the following operations: releasing a default physical layer configuration, releasing a default medium access control configuration, releasing a default semi-persistent scheduling configuration, and performing reestablishment of a radio link control layer corresponding to a radio bearer, and resetting a media access control.

Preferably, the "in a process of requesting on-demand system information by user equipment" comprises: before receiving a confirmation of a system information request from a lower layer, before receiving a confirmation of a RRC system information request from a lower layer, or before the completion of a random access procedure for system information request.

Preferably, the user equipment interrupting a system information request procedure comprises the following: the system information request procedure being interrupted/suspended/released, or the system information request procedure being abandoned.

In addition, according to the present invention, a user equipment is proposed, comprising: a processor; and a memory, storing instructions, wherein when executed by the processor, the instructions execute the method according to claim 1.

According to the present invention, radio resource allocation management may be effectively performed during a procedure of requesting on-demand system information by the UE.

In addition, according to the present invention, a base station is proposed, comprising: a processor; and a memory, storing instructions, wherein when executed by the processor, the instructions execute the method according to claim 3.

BRIEF DESCRIPTION OF THE DRAWINGS

The above and other features of the present invention will become more apparent in view of the following detailed disclosure with reference to the accompanying drawings, wherein.

DETAILED DISCLOSURE

Figure 1:
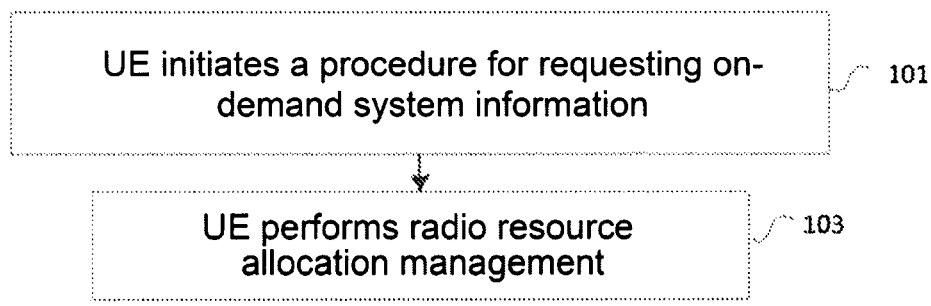
FIG. 1 is a flowchart illustrating a method implemented by a user equipment according to a first embodiment of the present invention.

The present invention will be described in detail subsequently with reference to the accompanying drawings and specific embodiments.

In the present invention, the terms "including", "comprising" and their derivatives mean "including but not limited to." The term "or" is inclusive and means and/or.

In this disclosure, the following various embodiments for describing the principle of the present invention are merely illustrative, and should not be construed as to limit the scope of the present disclosure in any way. The following description with reference to the accompanying drawings is used to facilitate a comprehensive understanding of the illustrative embodiments of the present invention defined by the claims and their equivalents. The following disclosure includes a variety of specific details to facilitate understanding, but these details should be considered as illustrative only. Therefore, those of ordinary skill in the art should recognize that various changes and modifications can be made to the embodiments described herein without departing from the scope and spirit of the present invention. In addition, for clarity and conciseness, disclosure of well-known functions and structures are omitted. In addition, throughout the accompanying drawings, the same reference numerals are used to represent similar functions and operations.

By considering an NR mobile communication system and subsequent evolved versions thereof as an illustrative application environment, a plurality of embodiments according to the present invention are described in detail subsequently. However, it should be pointed out that the present invention is not limited to the following embodiments but can be applied to other radio communication systems. Unless otherwise specified, with regard to the present invention, the concepts of a cell and a base station may be interchanged. The on-demand (requested) system information and the system information based on UE request are the same concept.

Some concepts related to the present invention are disclosed subsequently. It should be noted that some of the names in the following disclosure are merely illustrative and not limiting, and other names may also be used.

Message 1: the first message in the random access procedure, i.e., the random access preamble sent by the UE. The UE obtains the configuration (such as power parameters, number of transmissions, etc.) and resources (such as time-frequency domain resources) required to transmit Message 1 via system information. As the preamble is sent on the Physical Random Access Channel (PRACH), Message 1 is sometimes referred to as PRACH. The configuration and resources of Message 1 are also referred to as PRACH configuration and PRACH resources. In the present invention, PRACH resources also include PRACH preamble.

Random Access Response (RAR): the second message in the random access procedure. After receiving the random access preamble from the UE, a base station responds to the reception of the random access preamble by transmitting a random access response message. The random access response message includes a time advance field, an uplink grant field, a UE identifier field and so on. The random access response is also referred to as Message 2.

Message 3: the third message in the random access procedure. In the present invention, Message 3 refers collectively to an uplink transmission sent by the UE on an uplink resource indicated by an uplink grant included in the RAR.

Message 4: in the random access procedure, a downlink message used in response to Message 3 that is sent by a base station to the UE. The UE performs random access contention resolution based on Message 4 to verify whether this random access is successful.

In the current TS 38.331 approved by 3GPP, in an on-demand system information transmission, the UE requests a system information block as required by the UE from a base station by performing a random access procedure. Therefore, a request method based on Message 1 and a request method based on Message 3 are provided.

In the request method based on Message 1, the base station informs the UE of the PRACH configuration/resource for transmitting Message 1 via broadcast (such as SIB1). In other words, the PRACH configuration/resource used for the system information request is independent of the PRACH configuration/resource used for initial access or for other purposes. The PRACH configuration/resource used for the system information request is configured separately from the PRACH configuration/resource used for initial access or for other purposes. For example, each SI (or SIB) corresponds to a dedicated PRACH resource. The UE uses a corresponding PRACH resource to transmit a preamble to inform the base station which SI (or SIB) is requested. After receiving Message 1, the base station transmits a RAR to respond to the request of the UE and broadcast the SI (or SIB) requested by the UE in a subsequent period of time.

In the request method based on Message 3, the previously disclosed dedicated PRACH configuration/resource is not configured. The PRACH configuration/resource used by the UE is the same as the PRACH configuration/resource used for the initial access or for other purposes.

When the UE wants to obtain one or more SIs (or SIBs), the UE initiates a random access procedure and includes a list of SIs (or SIBs) it wants to acquire in Message 3 to inform the base station which SIs (or SIBs) it wants to acquire. Message 3 contains an RRC message (such as RRC system information request message, RRCsystemInforequest message) for system information request. After receiving Message 3, the base station transmits Message 4 in response to the request contained in Message 3 and to resolve contention in the random access procedure.

For the on-demand SIB/SI requested by the UE (i.e., the corresponding system information broadcast status is set to on-demand), when the UE wants to obtain one or more SIB/SI, if SIB1 contains PRACH resources of the SIB/SI that the UE wants to obtain, then the UE performs a method based on Message 1. The UE triggers a lower layer to use the corresponding PRACH resource to initiate a random access procedure. If a confirmation of the system information request from the lower layer is received, the UE starts to obtain the SIB/SI according to the scheduling information of the SIB/SI.

Conversely, if the SIB1 does not contain the PRACH resources of the SIB/SI that the UE wants to obtain, then the UE performs the method based on Message 3. The UE initiates transmission of an RRC system information request message. If a confirmation for the RRC system information request message from the lower layer is received, the UE starts to obtain the SIB/SI according to the scheduling information of the SIB/SI.

Regardless of whether the system information acquisition method is based on Message 1 or Message 3, the UE performs transmission according to a specific radio resource allocation such as a protocol layer configuration when transmitting and receiving. Based on the previous disclosure, the problems to be solved by the present invention are how to configure the radio resource allocation in a procedure for requesting on-demand system information by the UE and how to manage radio resource allocation under different circumstances such as cell reselection.

Embodiment 1

FIG. 1 is a flowchart illustrating a method implemented by a user equipment according to a first embodiment of the present invention.

FIG. 1 illustrates a radio resource allocation management method when initiating a procedure for requesting on-demand system information requested by the UE.

As illustrated in FIG. 1, in Step 101, the UE initiates a procedure for requesting on-demand system information.

In Step 103, the UE performs radio resource allocation management; in other words, the UE performs one or more of the following operations:

Operation 1: applying a default physical layer configuration. The default physical layer configuration refers to an RRC configuration predefined by the system for a physical layer. Preferably, it may include one or more of a physical downlink shared channel configuration, a physical uplink control channel configuration, a physical uplink shared channel configuration, an uplink power control configuration, a channel status indication configuration, a channel quality indication configuration, an uplink sounding reference signal configuration, an antenna information configuration, and a service request configuration.

Operation 2: applying a default Medium Access Control (MAC) main configuration, which may be referred to as MAC configuration for short. The default MAC main configuration refers to an RRC configuration predefined by the system for a MAC layer. Preferably, it may include one or more of a maximum number of HARQ transmissions, a buffer status report configuration, a discontinuous transmission configuration, a power headroom report configuration and so on.

Operation 3: applying a default semi-persistent scheduling configuration. The semi-persistent scheduling configuration may be called a configured grant, which may include a configured grant provided via RRC signaling and a grant provided via a Physical Downlink Control Channel (PDCCH) signaling (or known as a Downlink Control Information (DCI) signaling).

The previously disclosed default configuration refers to a predefined default configuration. This default configuration may use the same configuration parameters used during the initial access, or it may be a default configuration set specifically for system information requests. The present invention does not specify specific values in the default configuration.

The phrase "when initiating a procedure for acquiring on-demand system information requested by the UE" in Embodiment 1 may mean "when the UE requesting system information." The phrase "when performing the system information acquisition method based on Message 3" may mean "when initiating transmission of RRC system information request message."

Embodiment 2

Figure 2:
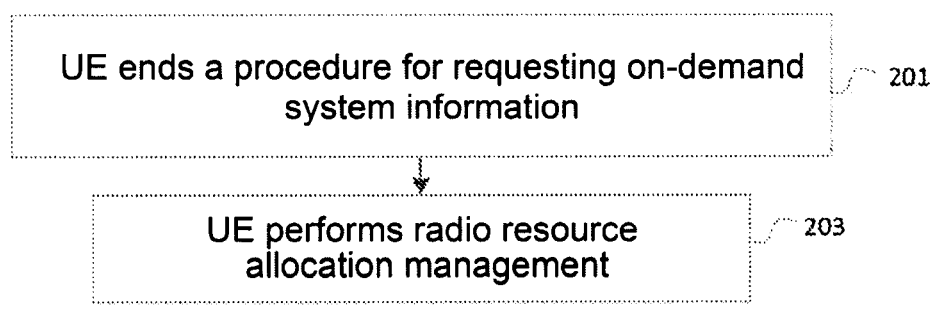
FIG. 2 is a flowchart illustrating a method implemented by a user equipment according to a second embodiment of the present invention.

FIG. 2 is a flowchart illustrating a method implemented by a user equipment according to a second embodiment of the present invention.

FIG. 2 illustrated a radio resource allocation management method when the UE ends a procedure for requesting on-demand system information.

As illustrated in FIG. 2, in Step 201, the UE ends a procedure for requesting on-demand system information.

In Step 203, the UE performs radio resource allocation management; in other words, the UE performs one or more of the following operations:

Operation 1: releasing a default physical layer configuration.

Operation 2: releasing a default MAC configuration.

Operation 3: releasing a default semi-persistent scheduling configuration.

Operation 4: performing a reestablishment of a Radio Link Control (RLC) layer corresponding to a radio bearer. Preferably, the radio bearer refers to Signaling Radio Bearer (SRB) 0. Alternatively, the radio bearer refers to all radio bearers, including SRB and Data Radio Bearer (DRB).

The default physical layer configuration, the default MAC main configuration, and the default semi-persistent scheduling configuration are the same as those in previously disclosed Embodiment 1, which are not repeated.

In Embodiment 2, the phrase "when the UE ends a procedure of system information request" may mean that the system information request procedure ends in success, or may refer to that the system information request procedure ends in failure. Therefore, the phrase "when the UE ends a procedure of system information request" may mean "when a confirmation of system information request from a lower layer is received" or "when a confirmation of RRC system information request message from a lower layer is received" or "when a random access failure indication from a lower layer is received" or "when a random access for system information request fails."

Embodiment 3

Figure 3:
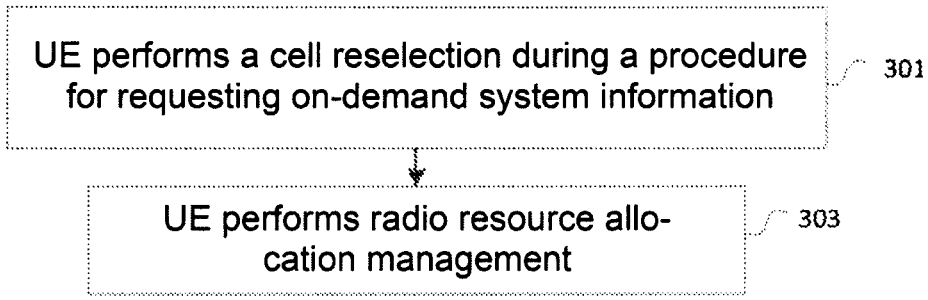
FIG. 3 is a flowchart illustrating a method implemented by a user equipment according to a third embodiment of the present invention.

FIG. 3 is a flowchart illustrating a method implemented by a user equipment according to a third embodiment of the present invention.

FIG. 3 illustrates a radio resource allocation management method when a cell reselection occurs during a procedure for requesting on-demand system information by the UE.

As illustrated in FIG. 3, in Step 301, UE performs a cell reselection during a procedure for requesting on-demand system information.

In Step 303, the UE performs radio resource allocation management. In other words, the UE performs one or more of the following operations:

Operation 1: releasing a default physical layer configuration.

Operation 2: releasing a default MAC configuration.

Operation 3: releasing a default semi-persistent scheduling configuration.

Operation 4: performing a reestablishment of a Radio Link Control (RLC) layer corresponding to a radio bearer. Preferably, the radio bearer refers to SRB 0. Alternatively, the radio bearer refers to radio bearers that have already been set up, including SRB and DRB.

Operation 5: resetting MAC. For details on resetting the MAC, see 3GPP TS 38.321, which is not repeated herein.

The default physical layer configuration, the default MAC main configuration, and the default semi-persistent scheduling configuration are the same as those in previously disclosed Embodiment 1, which are not repeated.

In Embodiment 3, the phrase "during a procedure for requesting on-demand system information by the UE" may mean "before receiving a confirmation of a system information request from a lower layer" or "before receiving a confirmation for an RRC system information request from a lower layer" or "before the completion of a random access procedure for a system information request." The completion of a random access procedure may refer to a successful completion of the random access procedure or an unsuccessful completion of the random access procedure.

Embodiment 4

Figure 4:
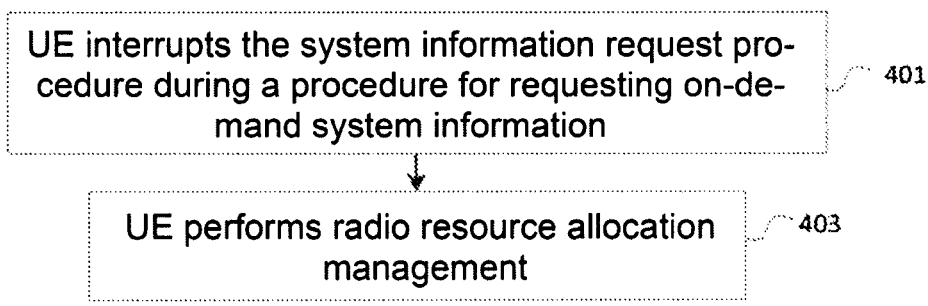
FIG. 4 is a flowchart illustrating a method implemented by a user equipment according to a fourth embodiment of the present invention.

FIG. 4 is a flowchart illustrating a method implemented by a user equipment according to a fourth embodiment of the present invention.

FIG. 4 illustrates a radio resource allocation management method when the UE interrupts the system information request procedure during a procedure for requesting on-demand system information by the UE.

As illustrated in FIG. 4, in Step 401, the UE interrupts the system information request procedure during a procedure for requesting on-demand system information.

In Step 403, the UE performs radio resource allocation management. In other words, the UE performs one or more of the following operations:

Operation 1: releasing a default physical layer configuration.

Operation 2: releasing a default MAC configuration.

Operation 3: releasing a default semi-persistent scheduling configuration.

Operation 4: performing a reestablishment of a Radio Link Control (RLC) layer corresponding to a radio bearer. Preferably, the radio bearer refers to SRB0. Alternatively, the radio bearer refers to radio bearers that have already been set up, including SRB and DRB.

Operation 5: resetting MAC. For details on resetting the MAC, see 3GPP TS 38.321, which is not repeated herein.

The default physical layer configuration, the default MAC main configuration, and the default semi-persistent scheduling configuration are the same as those in previously disclosed Embodiment 1, which are not repeated.

In Embodiment 4, the phrase "during a procedure for requesting on-demand system information by the UE" may mean "before receiving a confirmation of a system information request from a lower layer" or "before receiving a confirmation for an RRC system information request from a lower layer" or "before the completion of a random access procedure for a system information request." The completion of a random access procedure may refer to a successful completion of the random access procedure or an unsuccessful completion of the random access procedure.

In Embodiment 4, the UE interrupting the system information request procedure may occur, for example, when the upper layer of the UE ends an application or is not interested in an application, then the UE stops requesting the corresponding system information. The phrase "when the UE interrupts the system information request procedure" may mean "when the system information request procedure is interrupted/suspended/abandoned" or "when the system information request procedure is abandoned."

Embodiment 5

This embodiment provides a method for determining a random access resource in a system information request procedure based on Message 1. The random access resource refers to a PRACH resource or a RACH resource used to transmit a preamble for a system information request. The following SI may be replaced with SIB.

Step 1: the UE receives a scheduling information list (schedulinginfoList) of multiple SI and a random access resource list for system information request via SIB1. The scheduling information includes the system information broadcast status indication information of the current SI, such as whether the SI is on-demand or broadcast.

Step 2: if the random access resource list for system information request includes only one (or is regarded as one entry of a) random access resource, then the UE determines that the configuration of the random access resource is applicable to all SI with the system information broadcast status indication information configured as on-demand currently. Conversely, if the random access resource list for system information request includes multiple (or is regarded as multiple entries of) random access resources, then the number of entries and arrangement order in the random access resource list are preferably the same as the number of entries and arrangement order in the scheduling information list. That is, a first entry in the random access resource list corresponds to a first entry in the scheduling information list, a second entry in the random access resource list corresponds to a second entry in the scheduling information list, and so forth. Alternatively, the number of entries and arrangement order in the random access resource list are the same as the number of a plurality of entries and arrangement order in the scheduling information list where the system information broadcast status indication information is configured as on-demand. That is, a first entry in the random access resource list corresponds to a first entry where the system information broadcast status indication information is configured as on-demand in the scheduling information list, a second entry in the random access resource list corresponds to a second entry where the system information broadcast status indication information is configured as on-demand in the scheduling information list, and so forth.

In the present invention, "base station" refers to mobile communication data and control switching centers with large transmission power and wide coverage area, including functions such as resource allocation scheduling, data reception and transmission. "User equipment" refers to user equipment for a user, such as terminal equipment that can carry out wireless communication with base stations or micro base stations, such as mobile phones and notebooks.

The method and apparatus of the present invention have been disclosed with reference to the preferred embodiments. Those skilled in the art can understand that the disclosed method and apparatus are merely illustrative. The method and apparatus of the invention are not limited to the previous disclosure. The base station and user equipment may include more modules, such as modules that can be developed or will be developed in the future that can be used for a base station, Mobility Management Entity (MME), or UE and so on. The various disclosed symbols are merely illustrative and are not restrictive. The present invention is not limited to any specific cells which serve as examples of these symbols. Those skilled in the art can make many variations and modifications based on the teachings of the illustrated embodiments.

Figure 5:
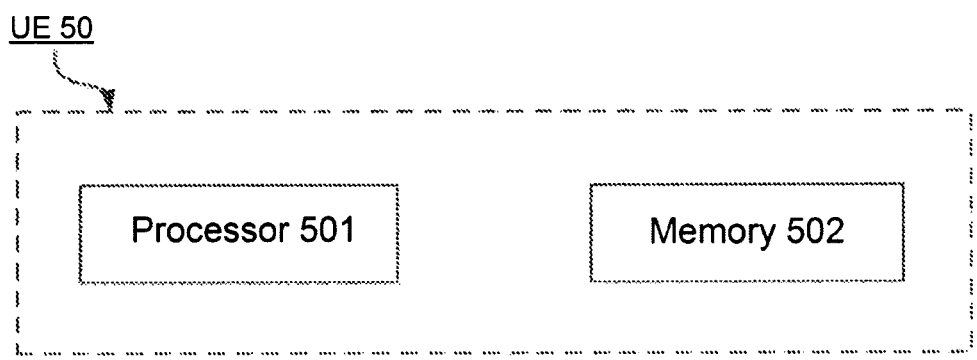
FIG. 5 is a block diagram illustrating a user equipment (UE) according to an embodiment of the present invention.

FIG. 5 is a block diagram illustrating a user equipment (UE) according to an embodiment of the present invention. As illustrated in FIG. 5, the user equipment UE 50 includes a processor 501 and a memory 502. The processor 501 may include, for example, a microprocessor, a microcontroller, an embedded processor, and the like. The memory 502 may include, for example, a volatile memory (such as a random access memory (RAM)), a hard disk drive (HDD), a non-volatile memory (such as a flash memory), or other memories. The memory 502 stores programmable instructions. When executed by the processor 501, the instructions can perform the disclosed methods of the user equipment according to the present invention.

The program executed by the device according to the present invention may be a program that enables a computer to implement the functions of the embodiments of the present invention by controlling a central processing unit (CPU). The program or information processed by the program may be temporarily stored in a volatile memory (such as a RAM), a HDD, a non-volatile memory (such as a flash memory), or another memory system.

Programs for executing the functions of the various embodiments of the present invention may be recorded in a computer-readable recording medium. Corresponding functions may be fulfilled by causing a computer system to read the programs recorded in the recording medium and execute these programs. The "computer system" may be a computer system embedded in the device, and may include an operating system or hardware (such as peripheral devices). The "computer-readable recording medium" may be a semiconductor recording medium, an optical recording medium, a magnetic recording medium, a recording medium storing a program dynamically for a short time, or any other recording medium readable by a computer.

Various features or functional modules of the devices used in the disclosed embodiments may be implemented or executed by circuits (for example, single-chip or multi-chip integrated circuits). Circuits designed to execute the functions described in this specification may include a general-purpose processor, a Digital Signal Processor (DSP), an Application-Specific Integrated Circuit (ASIC), a Field Programmable Gate Array (FPGA), or another programmable logic device, a discrete gate or transistor logic, a discrete hardware component, or any combination of the above devices. The general-purpose processor may be a microprocessor, or any existing processor, controller, microcontroller, or state machine. The circuit may be a digital circuit or an analog circuit. In the case of new integrated circuit technologies that replace existing integrated circuits due to advancements in the semiconductor technologies, one or a plurality of embodiments of the present invention may be implemented using these new integrated circuit technologies.

In addition, the present invention is not limited to the disclosed embodiments. Various examples of the embodiments have been disclosed. However, the present invention is not limited thereto. Fixed or non-mobile electronic devices mounted indoors or outdoors may be used as terminal devices or communication devices, such as Audio/Visual (AV) devices, kitchen devices, cleaning devices, air conditioners, office devices, vending machines, and other household appliances.

The embodiments of the present invention have been disclosed in detail with reference to the accompanying drawings. However, the specific structure is not limited to the disclosed embodiments, and the present invention includes any design changes that do not deviate from the gist of the present invention. In addition, various modifications may be made to the present invention within the scope of the claims, and embodiments obtained by appropriately combining the technical means disclosed in different embodiments are included in the technical scope of the present invention. In addition, the components having the same effects described in the above embodiments may be substituted for each other.

What is claimed is:

1. A method of system information transmissions performed by a user equipment (UE), the method comprising:

receiving a system information (SI) scheduling information list for a plurality of SI messages and a random access resource list for a plurality of SI requests via a system information block type 1 (SIB1), wherein each entry of the SI scheduling information list comprises an SI broadcast status indication of whether an SI message of the plurality of SI messages is on-demand or broadcast; and determining, when a plurality of random access resource entries exist in the random access resource list for the plurality of SI requests including a first SI request and a second SI request, that a first entry of the plurality of random access resource entries in the random access resource list for the first SI request corresponds to a first entry in the SI scheduling information list, the SI broadcast status indication being configured as on-demand in the first entry in the SI scheduling information list, and that a second entry of the plurality of random access resource entries in the random access resource list for the second SI request corresponds to a second entry in the SI scheduling information list, the SI broadcast status indication being configured as on-demand in the second entry in the SI scheduling information list.

2. A user equipment (UE) for performing system information transmissions, the UE comprising:

a processor; and a memory, storing instructions, wherein when executed by the processor, the instructions execute the method according to claim 1.

3. A method of system information transmissions performed by a base station (BS), the method comprising:

transmitting a system information (SI) scheduling information list for a plurality of SI messages and a random access resource list for a plurality of SI requests via a system information block type 1 (SIB1), wherein each entry of the SI scheduling information list comprises an SI broadcast status indication of whether an SI message of the plurality of SI messages is on-demand or broadcast, and when a plurality of random access resource entries exist in the random access resource list for the plurality of SI requests including a first SI request and a second SI request, a first entry of the plurality of random access resource entries in the random access resource list for the first SI request corresponds to a first entry in the SI scheduling information list, the SI broadcast status indication being configured as on-demand in the first entry in the SI scheduling information list, and a second entry of the plurality of random access resource entries in the random access resource list for the second SI request corresponds to a second entry in the SI scheduling information list, the SI broadcast status indication being configured as on-demand in the second entry in the SI scheduling information list.

4. A base station (BS) for performing system information transmissions, the BS comprising:

a processor; and a memory, storing instructions, wherein when executed by the processor, the instructions execute the method according to claim 3.

* * * * *